United States Patent [19]
Eutin et al.

[11] Patent Number: 5,189,715
[45] Date of Patent: Feb. 23, 1993

[54] OPTICAL WAVEGUIDE CONNECTION ELEMENTS

[75] Inventors: Wolfgang Eutin, Köln; Bernhard Groll, Weilerswist, both of Fed. Rep. of Germany

[73] Assignee: U.S. Philips Corp., New York, N.Y.

[21] Appl. No.: 747,214

[22] Filed: Aug. 19, 1991

[30] Foreign Application Priority Data

Aug. 24, 1990 [DE] Fed. Rep. of Germany ....... 4026709

[51] Int. Cl.$^5$ ............................................. G02B 6/38
[52] U.S. Cl. ......................................... 385/72; 385/70
[58] Field of Search ....................... 385/72, 78, 77, 76, 385/70

[56] References Cited

U.S. PATENT DOCUMENTS

| | | | |
|---|---|---|---|
| 4,526,438 | 7/1985 | Essert | 385/72 |
| 4,687,292 | 8/1987 | Krausse | 385/72 |
| 4,877,302 | 10/1989 | Schurmann et al. | 350/96.12 |
| 4,953,941 | 9/1990 | Takahashi | 385/72 |

Primary Examiner—Brian Healy
Assistant Examiner—Phan T. Heartney
Attorney, Agent, or Firm—William L. Botjer

[57] ABSTRACT

The invention relates to an optical plug connector comprising two plugs (1,2) each of which holds an end portion of an optical waveguide (OWG 10) and which can be inserted from opposite sides into a coupling sleeve (7) until the end faces of the OWGs (10) are located against each other, and comprising a guide element (5,9) for guiding and aligning the OWGs (10), which guide element can be axially inserted in both plugs (1,2) and which extends beyond their joint area. Damage to the OWGs caused by an inappropriate attempt to form a plug connection without using a guide element is precluded in that stop elements (17,18) are provided at the plugs, which stop elements cooperate with the stop elements of the mating plug in such a manner that when the guide element (9) is not inserted, the OWG-holding elements (12) of the plugs are prevented from moving completely towards each other in an axial direction.

3 Claims, 1 Drawing Sheet

OPTICAL WAVEGUIDE CONNECTION ELEMENTS

BACKGROUND OF THE INVENTION

The invention relates to an optical plug connector comprising two plugs each of which holds an end portion of an optical waveguide (OWG) and which can be inserted from opposite sides into a coupling sleeve until the end faces of the OWGs are located against each other, and comprising a guide element for guiding and aligning the OWGs, which guide element can be axially inserted in both plugs and which extends beyond their joint area.

Such a plug connector is described in DE 37 11 965 which corresponds to U.S. Pat. No. 4,877,302. It is possible that two plugs are mated in a coupling sleeve without a guide element being previously inserted in one of the plugs. Consequently, the unguided OWG-end faces may bump against each other or against plug components in an uncontrolled manner, which results in damage of said sensitive end faces of the OWGs.

It is an object of the invention to preclude that the OWGs are damaged owing to an inappropriate attempt to manufacture a plug connector without a guide element.

SUMMARY OF THE INVENTION

This object is achieved in that stop elements are provided at the plugs, which stop elements cooperate with the stop elements of the mating plug in such a manner that when the guide element is not inserted, at least the OWG-holding elements of the plugs are prevented from moving completely towards each other in an axial direction.

When the insertion of the guide element is unintentionally omitted, the stop elements according to the invention ensure that the plugs can no longer be brought into contact, so that the end faces of the OWGs can no longer bump against each other or against components of the plugs.

An advantageous embodiment is characterized in that the plugs are provided with projecting stops and corresponding recesses in such a manner that when the guide element is inserted, the projecting stops of the one plug fit in the recesses of the other plug, and when the guide element is not inserted the projecting stops and/or recesses are moved into a position such that the projecting stops of the one plug no longer fit in the recess of the other plug. Radially projecting stops may engage in axial slits of the mating plug or axial projections of a plug may engage in axial recesses of the mating plug.

In the absence of a guide element, the plugs can be prevented from moving too much towards each other by changing the position of the stop elements or of the recesses or by blocking the recesses or the slits. Said changes in position or blocks are reversed by inserting the guide element into a plug.

A solution which is suitable for, in particular, a plug connector of the type known from DE 37 11 965, consists in that a holding element which carries the OWGs and which is elastically movable in the plug comprises at least one axially oriented projecting stop and at least one axial recess.

Neither the provision nor the operating mechanism of the projecting stops and recesses require an appreciable additional expenditure.

BRIEF DESCRIPTION OF THE DRAWING

The invention will be explained in greater detail by means of a description of a preferred exemplary embodiment which is represented in the accompanying drawing.

DETAILED DESCRIPTION OF THE PREFERRED EMBODIMENTS

Figure 1:
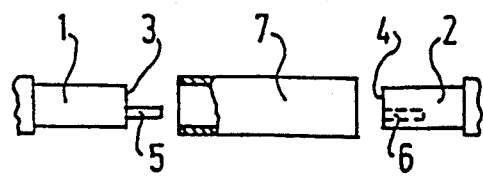
FIG. 1 shows the principle of a known plug connector of the type according to the invention.

In accordance with FIG. 1, two optical plugs 1 and 2 can be inserted into a sleeve 7 from opposite sides, in such a manner that their end faces 3 and 4, respectively, lie against each other. The part of the guide element 5 projecting from the plug 1 penetrates into the corresponding aperture of the mating plug 2.

Figure 2:
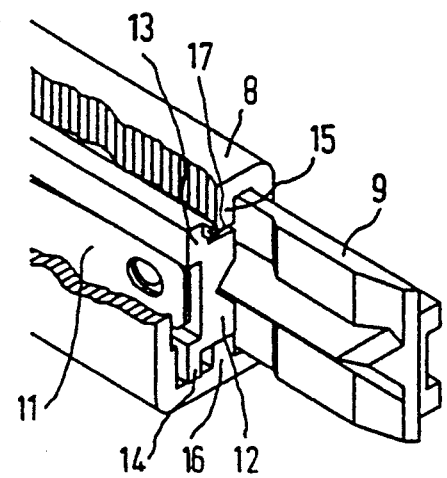
FIG. 2 is a, partially sectional, perspective view of the end portion of a plug according to the invention.

FIG. 2 shows details of a plug 1. A guide element 9 is slid into a guide aperture of the plug housing 8 up to a stop. The part of the guide element 9 projecting from the housing 8 can be introduced into a corresponding guide aperture (cf. reference numeral 6 in FIG. 1) of a mating plug. This is made easier by the bevelled front contours of the guide element 9.

Figure 3:
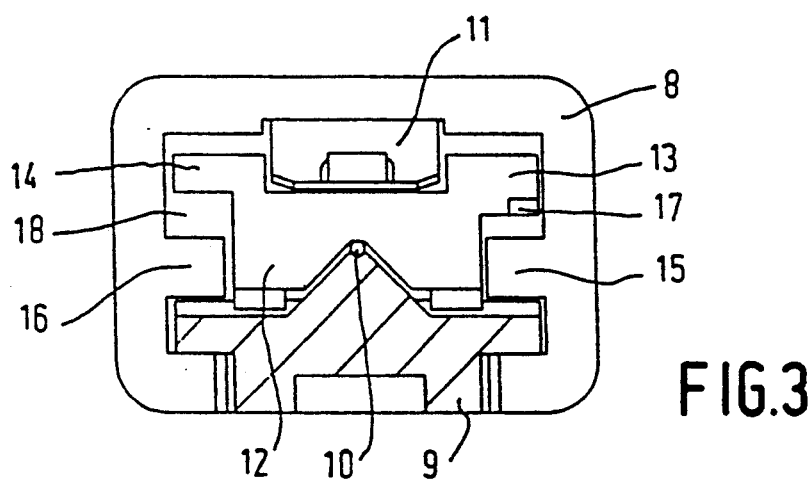
FIG. 3 is a front view of a plug according to FIG. 2.
Figure 4:
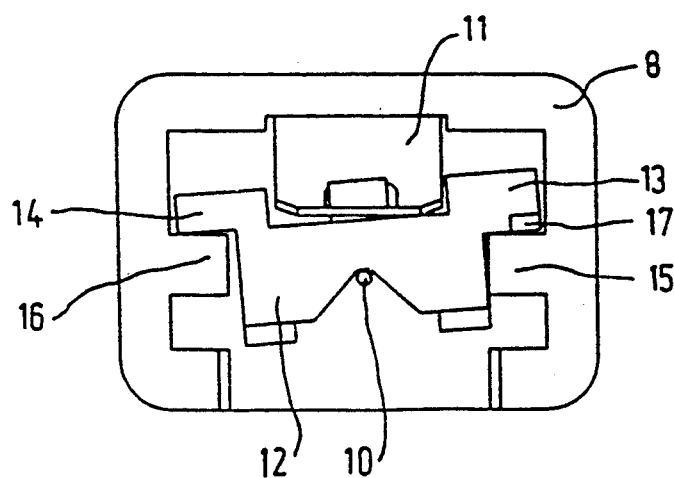
FIG. 4 shows the plug of FIG. 3 without a guide element.

As shown in FIGS. 3 and 4, an OWG 10 is bonded at the bottom of a V-shaped groove of the holding element 12. The holding element 12 is pressed on the guide element 9 by means of a spring 11, as a result of which the OWG 10 is accommodated in a V-shaped groove at the apex of the guide element 9 (FIG. 3). The end faces of the OWGs 10 of both plugs project slightly from the end faces of the holding elements 12. The OWG of a mating plug is slid in the V-shaped groove of the guide element to bring its end face into contact with that of OWG 10. The holding elements 12 of both plugs can be pressed back against a spring force.

The holding element 12 is arranged with a clearance on all sides relative to the neighbouring walls. When no guide element is used (FIG. 4), the spring 11 presses the holding element 12 with the high shoulder 13 and the low shoulder 14 on the neighbouring bearing surfaces 15 and 16, respectively, of the plug housing 8, thereby causing the holding element 12 to be obliquely positioned in the housing 8. In this configuration, an attempt to form a connection with a mating plug which does not have a guide element 9 either, would lead to axial stop cams bumping against a pressed-down flat shoulder 14 of the plug. An axial stop cam 17 of the mating plug would also bump against the flat shoulder 14. The holding elements would be prevented from moving completely towards each other in an axial direction, although the plug housings 8 could be pressed together against the spring forces acting between the holding elements 12 and the plug housings.

By the introduction of the guide element 9 in one of the plugs to be coupled (cf. FIG. 1) the holding element 12 is moved, against the pressure of the spring 11, into a higher position as shown in FIG. 3. In said position, the stop cam 17 fits in an aperture 18 of a mating plug whose holding element 12 is also lifted by the guide element 9 in the coupling operation. Conversely, the stop cam 17 then fits in an aperture 18 of the mating plug. This permits the coupling operation to be completed, i.e. until the end faces of the OWGs 10 contact each other.

We claim:

1. An optical plug connector having two plugs each of which holds an end portion of an optical waveguide and which can be inserted from opposite sides into a coupling sleeve until the end faces of the optical waveguides are located against each other, and comprising a guide element for guiding and aligning the optical waveguides, which guide element can be axially inserted in both plugs and which extends beyond their joint area, characterized in that stop elements are provided at the plugs, which stop elements cooperate with the stop elements of the mating plug in such a manner that when the guide element is not inserted, at least the optical waveguide holding elements of the plugs are prevented from moving completely towards each other in an axial direction.

2. An optical plug connector as claimed in claim 1, characterized in that the plugs are provided with projecting stops and corresponding recesses in such a manner that when the guide element is inserted, the projecting stops of the one plug fit in the recesses of the other plug, and when the guide element is not inserted at least one of the projecting stops and the recesses are moved into a position such that the projecting stops of the one plug no longer fit in the recess of the other plug.

3. An optical plug connector as claimed in claim 2, characterized in that a holding element which carries the optical waveguides is elastically movable in the plug and comprises at least one axially oriented projecting stop and at least one axial recess.

* * * * *